United States Patent [19]

Coulombe et al.

[11] Patent Number: 5,561,753
[45] Date of Patent: Oct. 1, 1996

[54] METHOD AND SYSTEM FOR RELOCATING SELECTABLE GRAPHICAL OBJECTS IN A GRAPHICAL USER INTERFACE ENVIRONMENT

[75] Inventors: Joseph S. Coulombe; Susan F. Henshaw; Sarah D. Redpath, all of Cary, N.C.

[73] Assignee: International Business Machines Corporation, Armonk, N.Y.

[21] Appl. No.: 161,299

[22] Filed: Dec. 2, 1993

[51] Int. Cl.$^6$ ............................................. G06F 3/14
[52] U.S. Cl. ............................................. 395/155
[58] Field of Search ............................. 395/155, 156, 395/157, 158, 159, 160, 161, 700, 800, 139

[56] References Cited

U.S. PATENT DOCUMENTS

| | | |
|---|---|---|
| 5,063,603 | 11/1991 | Burt . |
| 5,065,347 | 11/1991 | Pajak et al. . |
| 5,355,447 | 10/1994 | Knowlton ................................. 395/139 |
| 5,371,845 | 12/1994 | Newell et al. ........................... 395/155 |
| 5,377,317 | 12/1994 | Bates et al. .............................. 395/157 |
| 5,442,795 | 8/1995 | Levine et al. ........................... 395/800 |

*Primary Examiner*—Mark R. Powell
*Assistant Examiner*—Ruay Lian Ho
*Attorney, Agent, or Firm*—Gregory M. Doudnik

[57] ABSTRACT

A method and system for enhancing user efficiency in locating and accessing application and data files represented by selectable graphical objects in a graphical user interface environment. Selectable graphical objects are displayed within a graphical user interface environment, and a relocation criterion is associated with each of the selectable graphical objects. Periodically and automatically the location of the selectable graphical object is evaluated with respect to the relocation criterion and with respect to the current location of the selectable graphical object. In response to each evaluation of the relocation criterion, the selectable graphical objects may be relocated within a desired region for relocation within the graphical user interface environment. This relocation of selectable graphical objects provides an optimal arrangement facilitating efficient user interaction with the data processing system by relocating groups of selectable graphical objects in locations consistent with a predetermined frequency of access criterion, duration of access criterion or other similar priority determinations.

18 Claims, 4 Drawing Sheets

METHOD AND SYSTEM FOR RELOCATING SELECTABLE GRAPHICAL OBJECTS IN A GRAPHICAL USER INTERFACE ENVIRONMENT

BACKGROUND OF THE INVENTION

1. Technical Field

The present invention relates in general to an improved method and system for providing an interface between a user and a data processing system, and in particular to a method and system for processing and relocating selectable graphical objects in a graphical user interface environment. Still more particularly, the present invention relates to a method and system for relocating selectable graphical objects to provide an optimal arrangement facilitating efficient user interaction with the data processing system.

2. Description of the Related Art

Recently, data processing system graphical user interfaces have become increasingly popular. In a graphical user interface, selectable graphical objects, such as file cabinets, folders, documents, and printers, are displayed on the data processing system screen, in an area called the "workplace," as miniature graphic representations or icons. Users may manipulate these selectable graphical objects in ways which are similar to the manner in which such analogous objects are manipulated in the workplace. The selectable graphical objects may be manipulated with a mouse or other graphical pointing device to perform desired operations. Such operations may include accessing data files, storing or copying a data file on a disk drive, starting an application program, deleting an application program or data file from a disk drive, or moving any selectable graphical object to a different location.

One reason for the popularity of graphical user interfaces is that many users find that graphical user interfaces are intuitive and easy to utilize. This is because users may access data in data files and run application programs by interacting with (i.e., "pointing" and "clicking" on) selectable graphical objects displayed within the display screen which are associated with such data files and application programs. However, as the number of files stored within a data processing system increases, graphical user interfaces may become cluttered with icons which are either infrequently utilized or never utilized. Some of these icons are associated with data files or application programs stored for archival purposes. Consequently, a user may have hundreds of files stored within a data processing system, each having an associated icon, and the user may access only a small number of these files on a daily basis. In order to access a data file, a user may be required to view and manipulate numerous icons before finding a desired icon, and accessing the associated data file.

Some icons in a graphical user interface environment represent files created by an application which a user may rarely access, such as, for example, a "settings" file, or a temporary file created for the benefit of an application program, or a file that stores information that is only useful to an application program. When a user is looking for a desired data file, such rarely accessed files clutter the graphic user interface environment and distract the user. These icons should remain visible, either on the desktop or revealed by a window, so that such files may be moved or removed from the data processing system. While such files may be associated with a selectable graphical object which facilitates moving or removing such a file, such selectable graphical objects occupy workplace and window area without enhancing a users ability to interface with the data processing system in a typical, daily operation.

Thus, it should be apparent that a need exists for a method and system which enables a data processing system user to more efficiently locate and access application and data files represented by selectable graphical objects within a graphical user interface environment.

SUMMARY OF THE INVENTION

It is therefore one object of the present invention to provide an improved method and system for providing an interface between a user and a data processing system.

It is another object of the present invention to provide an improved method and system for processing and relocating selectable graphical objects in a graphical user interface environment.

It is yet another object of the present invention to provide an improved method and system for relocating selectable graphical objects to provide an optimal arrangement facilitating efficient user interaction with the data processing system.

The foregoing objects are achieved as is now described. A method and system are disclosed for enhancing user efficiency in locating and accessing application and data files represented by selectable graphical objects in a graphical user interface environment. Selectable graphical objects are displayed within a graphical user interface environment, and a relocation criterion is associated with each of the selectable graphical objects. Periodically and automatically the location of the selectable graphical object is evaluated with respect to the relocation criterion and with respect to the current location of the selectable graphical object. In response to each evaluation of the relocation criterion, the selectable graphical objects may be relocated within a desired region for relocation within the graphical user interface environment. This relocation of selectable graphical objects provides an optimal arrangement facilitating efficient user interaction with the data processing system by relocating groups of selectable graphical objects in locations consistent with a predetermined frequency of access criterion, duration of access criterion or other similar priority determinations.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF PREFERRED EMBODIMENT

Figure 1:
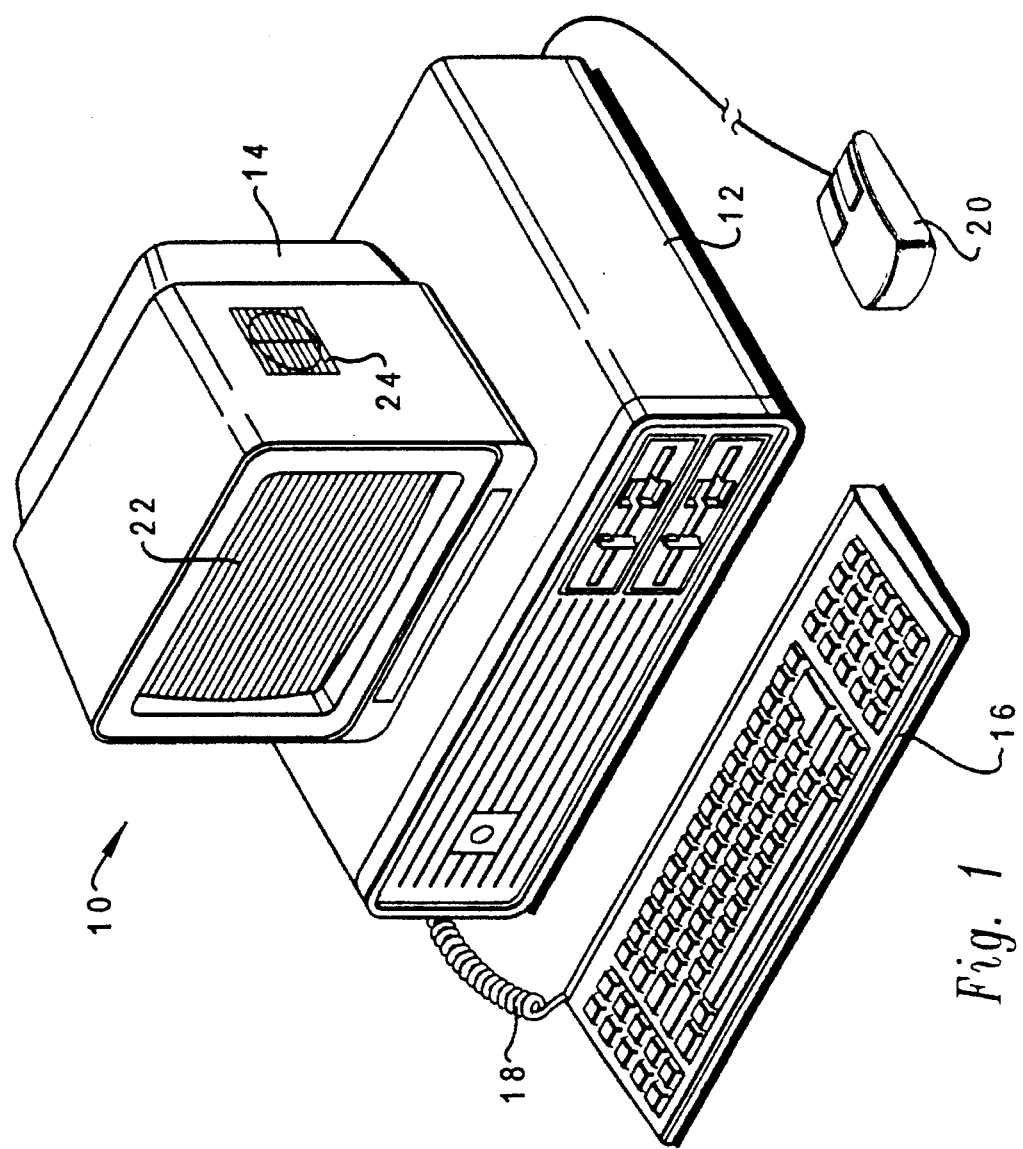
FIG. 1 is a pictorial representation of a data processing system which may be utilized to implement the method and system of the present invention.

With reference now to the figures and in particular with reference to FIG. 1, there is depicted a pictorial representation of a data processing system 10 which may be utilized to implement the method and system of the present invention. As is illustrated, data processing system 10 preferably includes a processor module 12 and a display 14. Keyboard 16 is coupled to processor module 12 by means of cable 18 in a manner well known in the art. Also coupled to processor module 12 is mouse 20.

As depicted, display 14 includes a display screen 22 and a speaker 24. Those skilled in the art will appreciate that data processing system 10 may be implemented utilizing any so-called "personal computer," such as the personal computer sold under the trademark "PS/2" and which is manufactured and distributed by International Business Machines Corporation.

Figure 2:
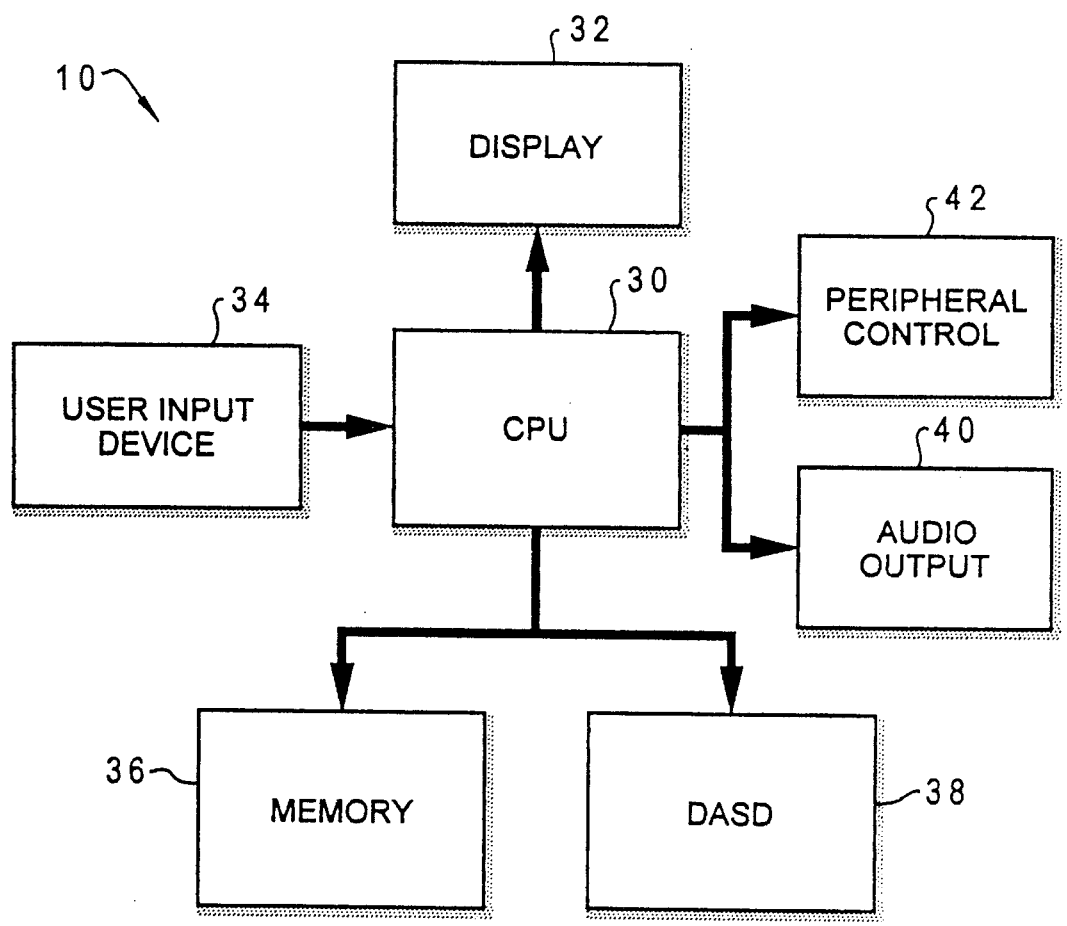
FIG. 2 is a high level block diagram of the data processing system of FIG. 1.

FIG. 2 is a high level block diagram further illustrating details of the preferred data processing system 10, as shown in FIG. 1. Data processing system 10 is controlled primarily by software executed within central processing unit (CPU) 30. CPU 30 is coupled to display 32, and receives user input from user input device 34. CPU 30 is also coupled to memory 36 and one or more direct access storage devices (DASDs) depicted at block 38. Memory 36 and DASD 38 may be utilized for storing data files and application programs. User input device 34 may be implemented utilizing a mouse, a touch sensitive tablet or screen, a joystick, a trackball, a screen activated light pen, or the like.

CPU 30 may also be coupled to audio output device 40 and peripheral controller 42. Audio output device 40 may include an amplifier and a speaker system. Peripheral controller 42 may be utilized to control peripheral devices, such as an optical secondary storage device (i.e., a CD-ROM), or an image scanner.

As those skilled in the art are well aware, a graphical user interface environment for a data processing system is implemented with computer readable code, also known as software. The high level flow chart included herein describes the logical steps carried out by software implementing the steps of the present invention. Software program code, which employs the present invention, is typically stored in the memory of a workstation. The software program code may be embodied on any of a variety of known media for use with a data processing system, such as a diskette or CD ROM. The code may be distributed on such media, or may be distributed to users from the memory of one computer system over a network of some type to other computer systems for use by users of such other systems. Such techniques and methods for embodying the software code on media and/or distributing software code are well known and will not be further discussed herein.

Figure 3:
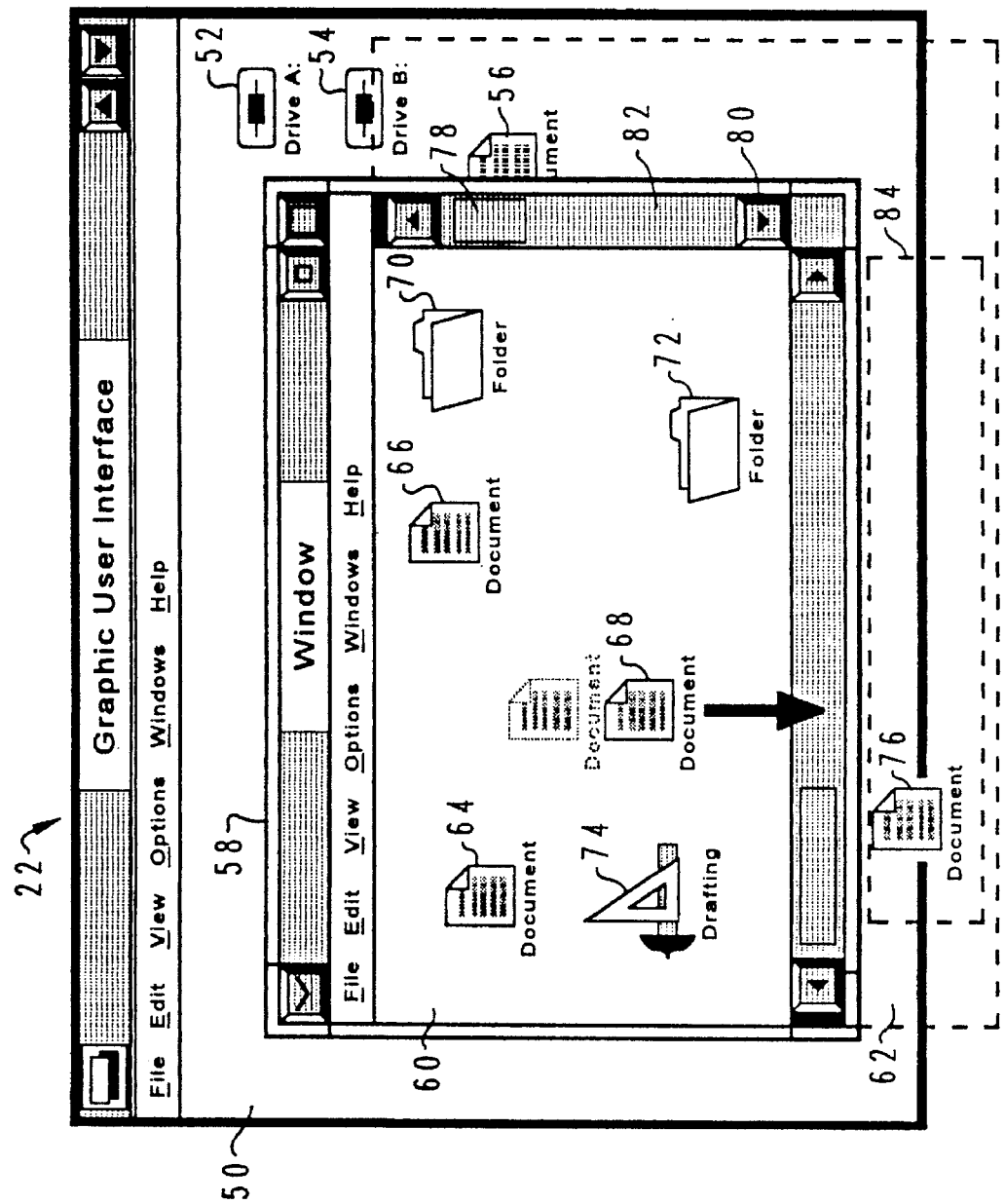
FIG. 3 is a pictorial representation of a display presentation which may be utilized to illustrate the method and system of the present invention.

With reference now to FIG. 3, there is depicted a pictorial representation of a display presentation which may be utilized to illustrate the method and system of the present invention. As illustrated, a graphical user interface is presented within display screen 22. Workplace 50 is a space provided by the graphical user interface wherein a user may perform all tasks and wherein all user graphical objects are displayed. In this example, the area of display screen 22 is substantially equivalent to workplace 50.

Throughout this description of the preferred embodiment, selectable graphical objects, which are graphical representations of either physical devices or data or application files stored within the data processing system, will be referred to by the name of the device or file. For example, rather than reciting "graphical representation of drive A 52," or "graphical representation of document 56," these devices and/or files will be referred to as "drive A 52" and "document 56" respectively. Those persons skilled in the art should recognize that a reference to "document 56" utilized in the context of describing a pictorial representation of a display presentation actually refers to a "graphical representation of document 56" rather than a printed document or a document stored in binary form within a data processing system.

Within workplace 50, drive A 52, drive B 54, and document 56 are displayed. Document 56 is partially obscured by a window 58. Window 58 has a work area 60 which reveals all or a portion of a virtual work area 62. Displayed within work area 60 are: documents 64, 66, and 68; folders 70 and 72; and application program 74. Document 76 is located within virtual work area 62, which in this example is larger than work area 60. Document 76 may be displayed within work area 60 if a user "scrolls" work area 60 in a downward direction utilizing scroll box 78 or scroll button 80 within scroll bar 82. Document 76 is also located within selected region 84. As illustrated, document 68 has been relocated by an incremental distance in a downward direction toward selected region 84. If document 68 is an infrequently utilized document, this relocation of document 68 toward selected region 84 unclutters workplace 50 by removing selectable graphical objects from view which are associated with unused or seldom used documents. Of course, those persons skilled in the art will recognize that selectable graphical objects, such as document 68, may be relocated within selected region 84 in a single move, rather than relocating the document periodically by an incremental distance toward selected region 84.

Figure 4:
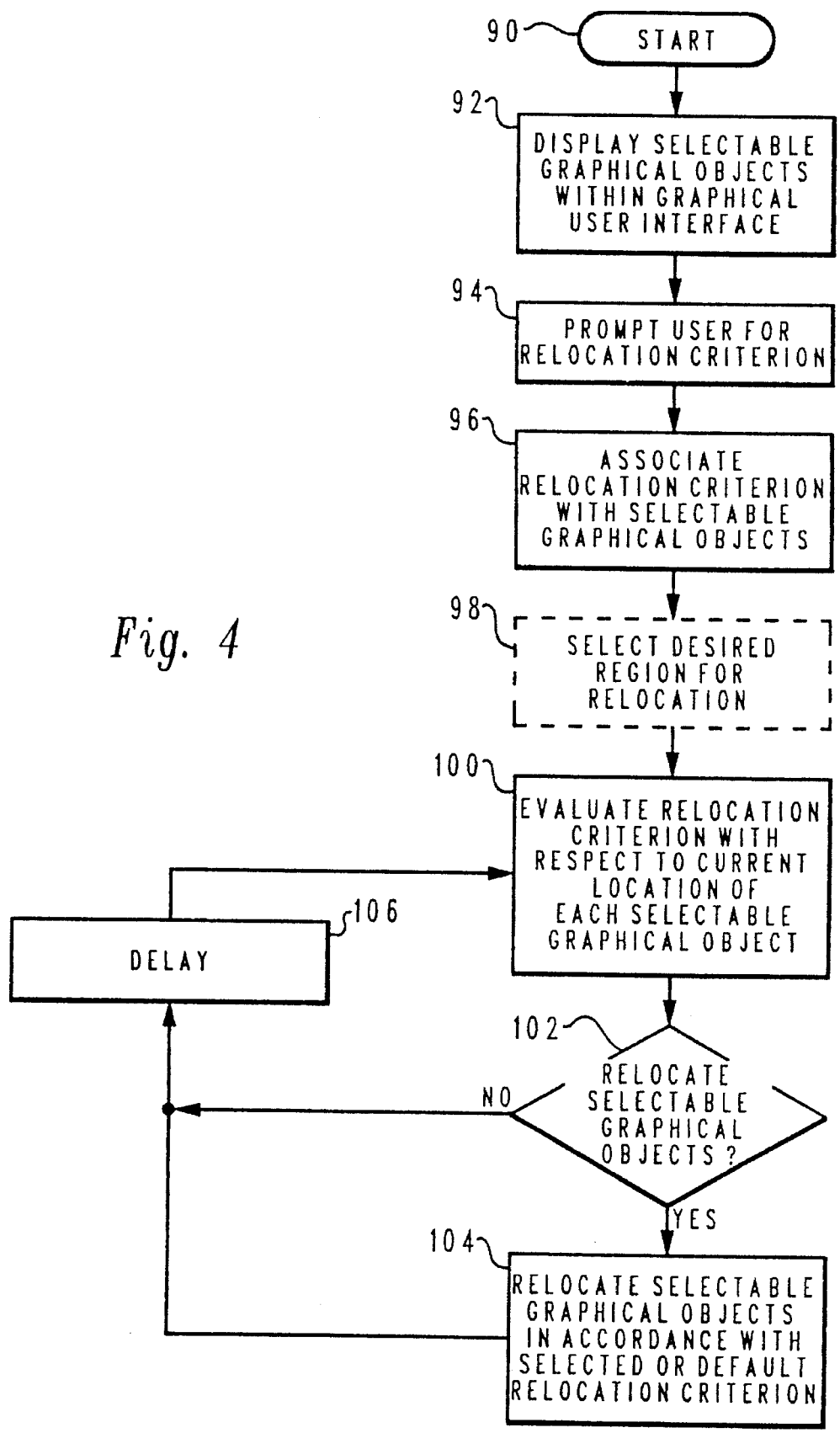
FIG. 4 depicts a high level logic flowchart which illustrates a preferred software implementation of the method and system of the present invention.

Finally, with reference to FIG. 4, there is depicted a high level logic flowchart which illustrates a preferred software implementation of the method and system of the present invention. After a user has invoked the feature of relocating selectable graphical objects by, for example, selecting appropriate inputs in a "preferences" menu, the process begins at block 90 and thereafter passes to block 92. Block 92 illustrates the display of selectable graphical objects within the graphical user interface. Selectable graphical objects may include: icons representing documents, such as document 56, 64, 66, 68, and 76; icons representing folders, such as folder 70 and 72; icons representing applications, such as application 74; and icons representing disk drives, such as drive A 52 and drive B 54 (see FIG. 3). Window 58 may also be considered a selectable graphical object. Each of these selectable graphical objects may be selectively relocated to provide an optimal arrangement which facilitates efficient user interaction with the graphical user interface environment and the data processing system by relocating selectable graphical objects that may clutter workplace 50 (see FIG. 3).

Next, the process passes to block 94, which depicts the process of prompting a user for input of relocation criterion. This relocation criterion will be utilized to periodically determine whether or not a selectable graphical object will be relocated. The relocation criterion may be a user selected criterion or a criterion based upon preset defaults. For example, such a relocation criterion may include a desired region for relocation, toward which a selectable graphical object will be moved as it is periodically relocated. Other relocation criterion may include, for example, criterion based upon frequency of access, duration of access, or importance of a selectable graphical object associated with a particular task, as determined by a prioritized list of tasks. Frequency of access may be determined by several methods. For example, frequency of access may be determined by the number of times an application program has been utilized, or the number of times data in a data file has been accessed. Such a frequency of access criterion may be relative to other files in the same workplace or window, or the frequency of access criterion may be absolute, so that if a file has not been accessed within a selected period of time, the process may determine that the graphical object representing the file should be relocated. A duration of access criterion may be computed by totaling the duration of access during a selected period of time, such as one week. Duration of access criterion may also be relative to the duration of access of the other files within the same workplace or window. Yet another relocation criterion which may be selected is the manner of relocating selectable graphical objects; a user may select a periodic incremental relocation process or a single step relocation process.

Thereafter, a relocation criterion is associated with each selectable graphical object, as illustrated at block 96. Each selectable graphical object may thereafter be relocated based upon a selected relocation criterion, or a selected combination of criteria, which may be different from the relocation criterion associated with other selectable graphical objects within the same workplace or window. The process of inputting relocation criterion illustrated at block 94, and the process of associating relocation criterion with selectable graphical objects illustrated at block 96, may be accomplished by utilizing a mouse to graphically select one or more selectable graphical objects and thereafter selecting a relocation criterion from a pull-down menu. Those persons skilled in the art should recognize that each one of the selectable graphical objects may be associated with relocation criterion, or a group of relocation criteria, selected specifically for that particular selectable graphical object. Moreover, if a user does not associate a selected relocation criterion with a selectable graphical object, a default relocation criterion may be utilized to relocate that selectable graphical object.

Next, a desired region for relocation may be selected by a user, as depicted at block 98. The dashed border indicates that this selection is an optional step in view of the fact that the relocation criterion may already include a desired region for relocation. The desired region for relocation may be located within workplace 50 for icons and windows within workplace 50, or within the work area of a window, such as work area 60 within window 58 (see FIG. 3). Those persons skilled in the art of graphic user interfaces will also recognize that the desired region for relocation may be selected from an area which is not currently displayed within a window, such as, for example, desired region for relocation 84, which is located within virtual work area 62, and which is not currently displayed within work area 60 of window 58 (see FIG. 3). Therefore, if the desired region for relocation is selected from a virtual work area which is not currently visible in a window, selectable graphical objects may be relocated such that they are not visible unless the user scrolls the work area.

Next, the process evaluates the relocation criterion with respect to the current location of the selectable graphical object, as illustrated at block 100. For example, as illustrated in FIG. 3, the relocation criterion evaluation may determine that document 68 is one of the most infrequently accessed documents within window 58, and that document 68 is not currently located within the desired region for relocation 84.

Next, the process passes to block 102, which depicts the determination of whether or not the selectable graphical object should be relocated. For example, if document 68 is one of the most infrequently accessed documents, and document 68 is not currently located within the desired region for relocation 84, then document 68 should be relocated. Conversely, if document 66 is one of the most frequently accessed documents, then document 66 need not be relocated. And if document 76 is one of the most infrequently accessed documents, and document 76 is located within the desired region for relocation 84, then document 76 need not be relocated.

If a selectable graphical object needs to be relocated, the process relocates the selectable graphical object to the desired region for relocation, or it another mode of operation, relocates the selectable graphical object toward the desired region for relocation by a predetermined incremental distance, as illustrated at block 104. If the selectable graphical object is relocated incrementally, the selectable graphical object is relocated by a predetermined incremental distance, which moves the graphical object toward the desired region for relocation in a series of moves. The incremental distance may be selected by the user and may be proportional to the speed at which the graphical object will move toward the desired region for relocation; a large incremental distance causes the graphical object to move toward the desired region for relocation at a greater speed.

After relocating the selectable graphical object, the process delays before evaluating the location of each particular selectable graphical object again, as depicted at block 106. This delay may be for a selected period of time, and such delay time will also affect the speed at which the graphical object will move toward the desired region for relocation. The delay time may be selected when the user inputs relocation criterion, as illustrated at block 94, or a default value may be utilized.

Referring to block 102 again, if a selectable graphical object does not need to be relocated, the process passes to block 106. After the delay depicted at block 106, the process passes to block 100, and the location of the selectable graphical object is evaluated again.

Upon reference to the foregoing, those skilled in the art of graphic user interface design will appreciate that by relocating certain selectable graphical objects, an optimal arrangement of the selectable graphical objects may be achieved, permitting more efficient user interaction with the data processing system. Selectable graphical objects may be relocated in a desired region for relocation which is in a region of a virtual work area of a window which is not currently or typically displayed by the window. By relocating selectable graphical objects outside the present view of a window, the window work area may become less cluttered, and a user may be able to locate a particular file more efficiently. Relocated files remain in the data processing system, and may be viewed by allowing the user to scroll the window work area utilizing a window scroll box or scroll button, so that the region of the virtual work area which is not usually displayed becomes visible.

Selectable graphical objects may be relocated based upon the evaluation of various relocation criteria associated with each selectable graphical object, and based upon the present location of the selectable graphical object relative to the desired region for relocation. An optimal arrangement of selectable graphical objects may be achieved by several means. For example, infrequently accessed or low priority selectable graphical objects may be relocated outside the present view of a window work area. Infrequently accessed selectable graphical objects in the workplace may be relocated toward a desired region for relocation in the center of the workplace or display screen. For example, infrequently accessed document 56 may be relocated toward the center of workplace 50, where document 56 is more likely to be obscured by a window, such as window 58, and wherein the area along the outside edges of workplace 50 is available to display selectable graphical objects associated with more frequently accessed data or application programs.

Those persons skilled in the art should recognize that windows, such as window 58, may also be relocated based upon the evaluation of a relocation criterion. For example, a window containing infrequently accessed graphical objects may be incrementally relocated toward a desired region for relocation near the bottom of workplace 50, such that only the title bar of window 58 is visible at the bottom edge of workplace 50. Alternatively, a window containing infrequently accessed graphical objects may be relocated along a simulated Z-axis perpendicular to display screen 22 (see FIG. 1). Those persons skilled in the art should recognize that a data processing system screen display may be implemented to simulate three dimensional space, albeit the display screen is two dimensional, having only X- and Y-axes. Such relocation along the Z-axis will incrementally relocate windows containing less frequently accessed graphical objects behind other windows containing more frequently accessed graphical objects. Additionally, as windows are relocated along the Z-axis, the size of the window may be reduced, thereby creating the appearance that the window has been relocated further behind the plane of display screen 22. The size of the relocated window may eventually be decreased such that the window appears as if it were an icon.

Other methods for relocating selectable graphical objects may utilize two desired regions for relocation; wherein a first desired region for relocation may be utilized as a region for displaying selectable graphical objects associated with infrequently accessed data or applications, and a second desired region for relocation may be utilized for displaying selectable graphical objects associated with frequently accessed data or application. Therefore, as a graphical object which had been infrequently accessed becomes more frequently accessed, that selectable graphical object will be relocated from the desired region for relocation for infrequently accessed graphical objects to the desired region for relocation for frequently accessed graphical objects.

While the invention has been particularly shown and described with reference to a preferred embodiment, it will be understood by those skilled in the art that various changes in form and detail may be made therein without departing from the spirit and scope of the invention.

What is claimed is:

1. A method in a data processing system having a display screen for processing and relocating selectable graphical objects in a graphical user interface environment, said method comprising the steps of:

displaying a selectable graphical object at a location within said graphical user interface environment;

associating a relocation criterion with said selectable graphical object which includes at least a desired region for relocation within said graphical user interface environment;

periodically and automatically evaluating said location of said selectable graphical object with respect to said relocation criterion; and relocating said selectable graphical object within said desired region for relocation in response to each evaluation of said relocation criterion.

2. The method in a data processing system for processing and relocating selectable graphical objects in a graphical user interface environment according to claim 1 wherein said step of relocating said selectable graphical object within said desired region for relocation in response to each evaluation of said relocation criterion comprises the step of incrementally relocating said selectable graphical object in response to each evaluation of said relocation criterion toward said desired region for relocation until said selectable graphical object is located within said desired region for relocation.

3. The method in a data processing system for processing and relocating selectable graphical objects in a graphical user interface environment according to claim 1 wherein said relocation criterion comprises a current location within said graphical user interface environment, availability of another location within a selected region, and a frequency of access of said selectable graphical object.

4. The method in a data processing system for processing and relocating selectable graphical objects in a graphical user interface environment according to claim 1 wherein said relocation criterion comprises a current location within said graphical user interface environment, availability of another location within a selected region, and a duration of access of said selectable graphical object.

5. The method in a data processing system for processing and relocating selectable graphical objects in a graphical user interface environment according to claim 1 further including the steps of:

displaying a window revealing a first portion of a virtual space within said graphical user interface environment;

scrolling said window to reveal a second portion of said virtual space not previously revealed by said window;

selecting said desired region for relocation from said second portion of said virtual space; and incrementally relocating said selectable graphical object, in response to each evaluation of said relocation criterion until said selectable graphical object is located within said desired region for relocation, whereby said selectable graphical object may be relocated outside of said virtual space revealed by said window.

6. The method in a data processing system for processing and relocating selectable graphical objects in a graphical user interface environment according to claim 1 further including the step of selecting said desired region for relocation of said selectable graphical object.

7. The method in a data processing system for processing and relocating selectable graphical objects in a graphical user interface environment according to claim 6 wherein said step of selecting said desired region for relocation of said selectable graphical object further includes the steps of:

selecting a first desired region for relocation for locating said selectable graphical objects which substantially satisfy said relocation criterion;

selecting a second desired region for relocation for locating said selectable graphical objects which do not substantially satisfy said relocation criterion; and incrementally relocating said selectable graphical object, in response to each evaluation of said relocation criterion until said selectable graphical object is located within either said first or second desired region for relocation, depending upon whether or not said relocation criterion is substantially satisfied.

8. The method in a data processing system for processing and relocating selectable graphical objects in a graphical user interface environment according to claim 7 further including the step of incrementally relocating said window along a simulated Z-axis extending perpendicularly backward from the surface of said display screen.

9. The method in a data processing system for processing and relocating selectable graphical objects in a graphical user interface environment according to claim 1 wherein said selectable graphical object is a window.

10. A data processing system for processing and relocating selectable graphical objects in a graphical user interface environment, said system comprising:

means for displaying a selectable graphical object at a location within said graphical user interface environment;

means for associating a relocation criterion with said selectable graphical object which includes at least a desired region for relocation within said graphical user interface environment;

means for periodically and automatically evaluating said location of said selectable graphical object with respect to said relocation criterion; and means for relocating said selectable graphical object within said desired region for relocation in response to each evaluation of said relocation criterion.

11. The data processing system for processing and relocating selectable graphical objects in a graphical user interface environment according to claim 10 wherein said means for relocating said selectable graphical object within said desired region for relocation in response to each evaluation of said relocation criterion comprises means for incrementally relocating said selectable graphical object in response to each evaluation of said relocation criterion until said selectable graphical object is located within said desired region for relocation.

12. The data processing system for processing and relocating selectable graphical objects in a graphical user interface environment according to claim 10 wherein said relocation criterion comprises a current location within said graphical user interface environment, availability of another location within a selected region, and a frequency of access of said selectable graphical object.

13. The data processing system for processing and relocating selectable graphical objects in a graphical user interface environment according to claim 10 wherein said relocation criterion comprises a current location within said graphical user interface environment, availability of another location within a selected region, and a duration of access of said selectable graphical object.

14. The data processing system for processing and relocating selectable graphical objects in a graphical user interface environment according to claim 10 further including:

means for displaying a window revealing a first portion of a virtual space within said graphical user interface environment;

means for scrolling said window to reveal a second portion of said virtual space not previously revealed by said window;

means for selecting said desired region for relocation from said second portion of said virtual space; and means for incrementally relocating said selectable graphical object, in response to each evaluation of said relocation criterion until said selectable graphical object is located within said desired region for relocation, whereby said selectable graphical object may be relocated outside of said virtual space revealed by said window.

15. The data processing system for processing and relocating selectable graphical objects in a graphical user interface environment according to claim 14 wherein said means for selecting said desired region for relocation of said selectable graphical object further includes:

means for selecting a first desired region for relocation for locating said selectable graphical objects which substantially satisfy said relocation criterion;

means for selecting a second desired region for relocation for locating said selectable graphical objects which do not substantially satisfy said relocation criterion; and means for incrementally relocating said selectable graphical object, in response to each evaluation of said relocation criterion until said selectable graphical object is located within either said first or second desired region for relocation, depending upon whether or not said relocation criterion is substantially satisfied.

16. The data processing system for processing and relocating selectable graphical objects in a graphical user interface environment according to claim 10 further including means for selecting said desired region for relocation of said selectable graphical object.

17. The data processing system for processing and relocating selectable graphical objects in a graphical user interface environment according to claim 10 wherein said selectable graphical object is a window.

18. The data processing system for processing and relocating selectable graphical objects in a graphical user interface environment according to claim 17 further including means for incrementally relocating said window along a simulated Z-axis extending perpendicularly backward from the surface of said display screen.

* * * * *